United States Patent [19]

Watanabe

[11] Patent Number: 4,541,089
[45] Date of Patent: Sep. 10, 1985

[54] APPARATUS FOR CONNECTING DIGITAL DATA
[75] Inventor: Nobuhiko Watanabe, Tokyo, Japan
[73] Assignee: Sony Corporation, Tokyo, Japan
[21] Appl. No.: 466,908
[22] Filed: Feb. 16, 1983
[30] Foreign Application Priority Data Feb. 17, 1982 [JP] Japan ................. 57-23796

[51] Int. Cl.³ .......................... G11B 27/02; G11B 5/00
[52] U.S. Cl. ............................................ 371/8; 360/13
[58] Field of Search ................. 371/38, 40, 8; 360/13, 360/32, 53, 14.3

[56] References Cited

U.S. PATENT DOCUMENTS

| | | | |
|---|---|---|---|
| 4,234,896 | 11/1980 | Onishi et al. | 360/14.3 |
| 4,292,684 | 9/1981 | Kelly et al. | 371/40 |
| 4,327,382 | 4/1982 | Tanaka | 360/13 |
| 4,393,502 | 7/1983 | Tanaka et al. | 371/40 |
| 4,423,441 | 12/1983 | Ozaki et al. | 360/13 |
| 4,441,184 | 4/1984 | Sonoda et al. | 371/40 |

Primary Examiner—Michael R. Fleming
Attorney, Agent, or Firm—Lewis H. Eslinger; Alvin Sinderbrand

[57] ABSTRACT

In an apparatus for connecting first and second digital data which overlap before and after a connecting point, and in which said digital data is muted after the connecting point for limiting errors in the output from the apparatus, the combination of a detector which detects when the muting of the second digital data terminates and which generates detection signals in response thereto, and a cross-fader which gradually fades out the first digital data and gradually fades in the second digital data in response to the detection signals.

20 Claims, 50 Drawing Figures

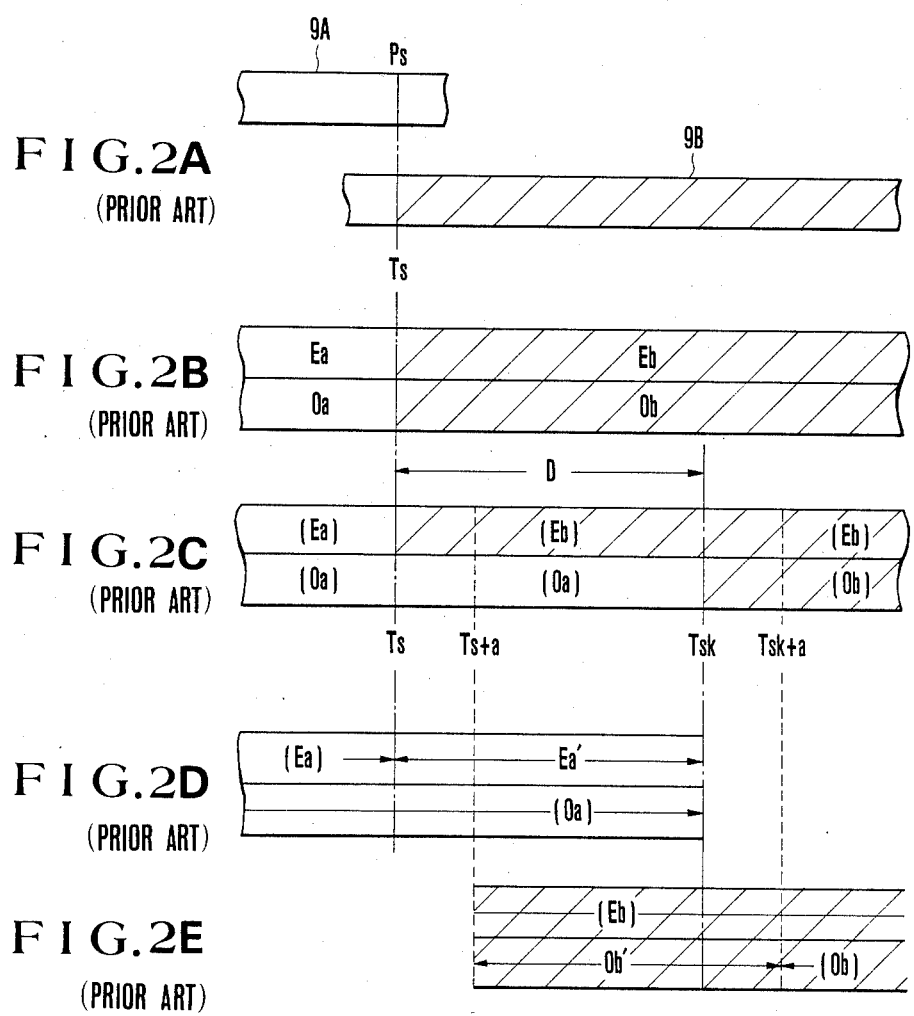

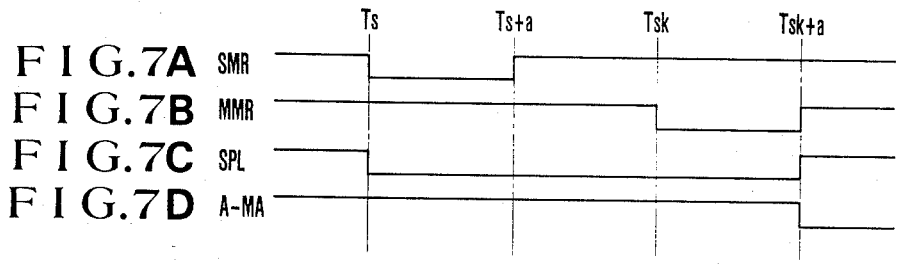
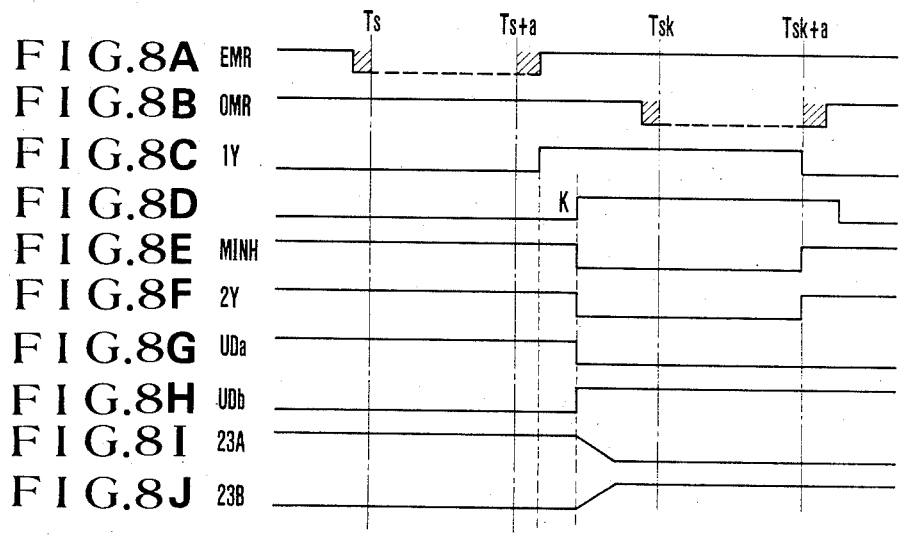

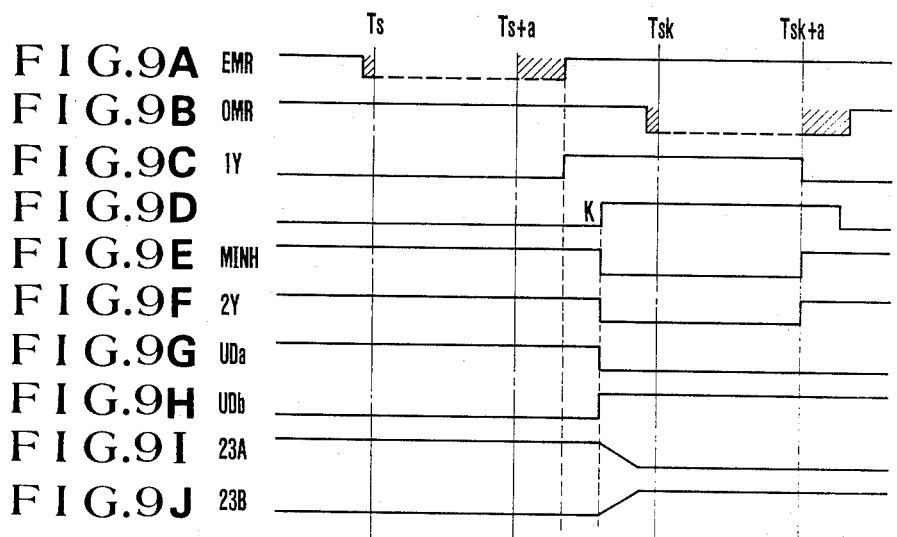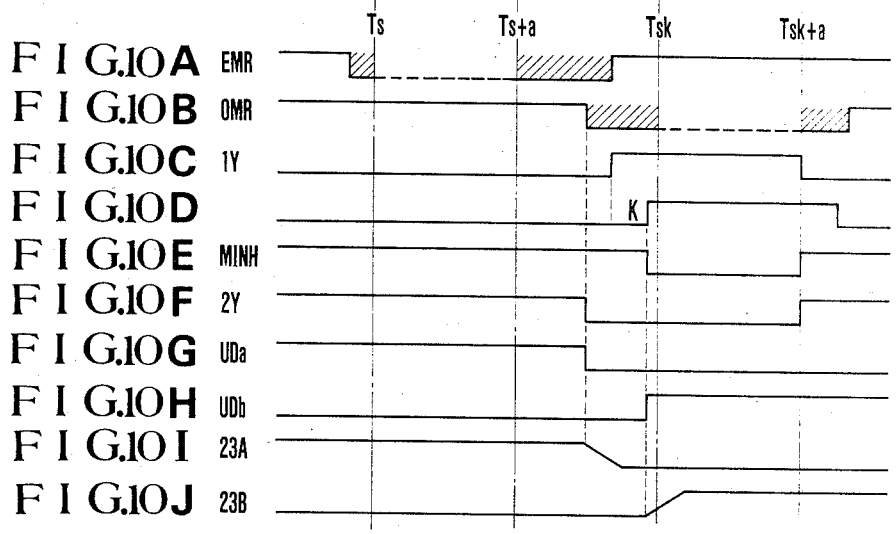

APPARATUS FOR CONNECTING DIGITAL DATA

BACKGROUND OF THE INVENTION

1. Field of the Invention

This invention relates to an apparatus for connecting digital data, and more particularly, to an apparatus for connecting digital data recorded on magnetic tape which has been splice edited.

2. Description of the Prior Art

The applicant has earlier proposed a method of transmitting a pulse coded modulation (PCM) signal with error correction capabilities. Such a method is disclosed in, for example, British specification No. 2060227A, corresponding to U.S. patent application Ser. No. 195,625, filed Oct. 9, 1980, now U.S. Pat. No. 4,393,502. In accordance with the above disclosure, a one-channel PCM signal is divided into two series of words: even numbered words and odd numbered words. An even-/odd distributor is used in a digital encoder to divide the one-channel PCM signal into the two word series. The even numbered words are delayed by an amount D through a delay circuit. The delayed even numbered word series and the odd numbered word series (which are not delayed) are supplied to separate correction encoders where the words are encoded. After the encoding step, the words are synthesized and modulated by a modulator for transmission.

The above-described method of transmitting a PCM signal can be used, for example, in a digital tape recorder in which an audio signal is digitally recorded on a magnetic tape. It is sometimes desirable, however, to splice edit a magnetic tape containing a digital signal recorded as described above. In a splice editing operation, the even numbered word series and odd numbered word series are supplied to error correction circuits where, in addition to error correction operations, appropriate compensation is applied to correct for the delay in the even numbered word series. After the error correction operations, a cross-fader is used to connect the data recorded on the magnetic tape before and after the splice editing point.

An interval with many errors in the data can occur before and after a splice editing point on the magnetic tape. A muting operation is usually applied to the interval where the errors are detected in order to improve the signal reproduced from the cross-faded data. If the time for the beginning of the cross-fading operation is fixed in relation to the position of the splice editing point, and if the muting interval is long, the average level of the PCM signal reproduced in the cross-fade interval can be reduced to an unsatisfactory level due to the operation of the cross-fader.

OBJECTS AND SUMMARY OF THE INVENTION

It is therefore an object of the present invention to provide an apparatus for connecting digital data recorded on a magnetic tape which overcomes the aforementioned difficulties of the prior art.

It is another object of the present invention to provide an apparatus for connecting first and second digital data which prevents the average level of the data in the transition between the first and second data from being substantially reduced, even when there is a long interval where a large number of errors must be muted.

In accord with the present invention, in an apparatus for connecting first and second digital data which overlap before and after a connecting point and in which the digital data is muted after the connecting point for limiting errors in the output from the apparatus, the combination of detecting means for detecting when the muting of the second digital data terminates and generating detection signals in response thereto, and cross-fading means for gradually fading out the first digital data and gradually fading in the second digital data in response to the detection signals.

The above, and other objects, features and advantages of the present invention will be apparent from the following detailed description of an illustrative embodiment thereof which is to be read in connection with the accompanying drawings.

BRIEF DESCRIPTION OF THE DRAWINGS

FIGS. 2A–2E are schematic representations of portions of magnetic recording tape having signals recorded thereon suitable for splicing together in accordance with known prior art techniques;

FIGS. 6A–6E are waveform diagrams useful in explaining the cross-fading operation provided by the circuit of FIG. 4 according to the present invention;

FIGS. 7A–7D are waveform diagrams of the request signals utilized in the circuit of FIG. 5;

FIGS. 8A–8J are waveform diagrams of certain signals present in the circuit of FIG. 5;

FIGS. 9A–9J are waveform diagrams of certain signals present in the circuit of FIG. 5 in the case of a drop out;

FIGS. 10A–10J are waveform diagrams of certain signals in the circuit of FIG. 5 in which extreme errors are present in the signal following a splicing operation according to circuit of FIG. 4.

DETAILED DESCRIPTION OF THE PREFERRED EMBODIMENT

Figure 1:
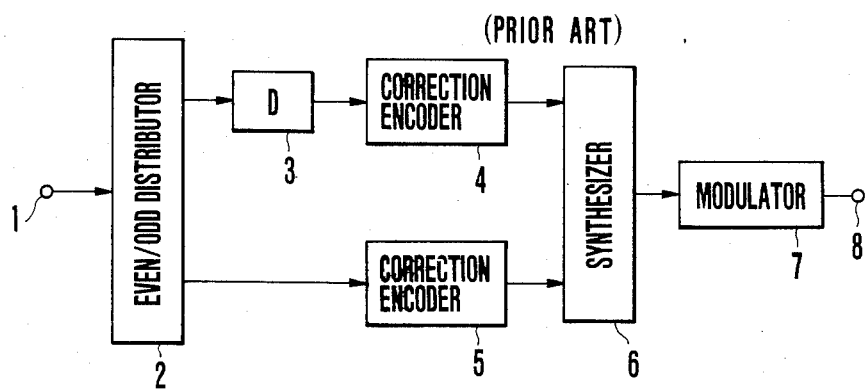
FIG. 1 is a block diagram of a prior art system for transmitting a pulse coded modulation signal.

Referring to the drawings and initially to FIG. 1 thereof, a prior art apparatus for connecting first and second data, such as comprise an audio PCM signal, is shown. A one-channel PCM signal for which one sample has been converted into one word is supplied to an input terminal 1. An even/odd distributor 2 divides the one-channel PCM signal into an even numbered word series and an odd numbered word series. The even numbered word series is supplied through a delay circuit 3, having a delay amount D, to a correction encoder 4. The odd numbered word series is supplied directly to a correction encoder 5. Correction encoders 4 and 5 perform time-interleaving of the digital data supplied thereto (wherein the sequence of words comprising the digital data are rearranged in time), and other processing operations such as error correction (which may be, for example, the generation of a parity code or the like). Data from correction encoders 4, 5 are supplied to a synthesizer 6, a modulator 7 and thence, to an output terminal 8.

As described above, it is possible substantially to prevent data from being lost due to a dropout or the like at a connecting point in the data by shifting the even numbered word series and the odd numbered word series in time (i.e., time-interleaving the even and odd numbered words), and by performing error correction operations on the interleaved words. A reproduction circuit performs the error correction operations separately for the even numbered word series and the odd numbered word series, and delays the odd numbered word series by amount D in order to compensate for the delay D introduced by delay circuit 3 to the even numbered words in the encoding operation.

FIG. 2 illustrates a splice editing operation performed on a magnetic tape used in conjunction with the apparatus of FIG. 1. As shown in FIG. 2A, magnetic tapes 9A and 9B are cut at a splice point Ps, and magnetic tape 9B (indicated by the oblique lines) is connected behind magnetic tape 9A at the boundary of splice point Ps.

FIG. 2B illustrates the even numbered word series and odd numbered word series which are supplied to two correction decoders when the magnetic tape has been splice edited in the above-described manner. For ease in understanding, FIG. 2B shows the even words Ea and Eb and the odd words Oa and Ob recorded in separate tracks on magnetic tapes 9A and 9B. It will be appreciated that the odd and even words are recorded in a single track in successive, serially-by-word transmission blocks. Splice point Ps arrives at the stationary PCM playback head at time Ts. It is seen, from FIG. 2B, that at times prior to time Ts, which corresponds to the edit point, even and odd words are reproduced from magnetic tape 9A. At times following edit point Ts, even and odd words are reproduced from magnetic tape 9B. However, by reason of delay circuit 3, it is recognized that, when odd words Oa are reproduced from magnetic tape 9B, the even words which then are in time-alignment therewith are those delayed even words Ea which have been reproduced from magnetic tape 9A and are delayed by D time units.

The even numbered words Ea and odd numbered words Oa reproduced from magnetic tape 9A appear before an editing point Ts which has a timing corresponding to splice point Ps. After editing point Ts, the even numbered words Eb and odd numbered words Ob from magnetic tape 9B are reproduced. As described above, one error correction decoder performs error correction processing operations on the even numbered words Ea and Eb. A second error correction decoder performs error correction processing operations on the odd numbered words Oa and Ob. (In the figures, the word series to which the error correction operation has been performed is indicated by a reference character contained within parenthesis ().

Since the odd numbered words (Oa) and (Ob) are delayed by an amount D by a delay circuit, as shown in FIG. 2C, a delayed editing point Tsk appears in the odd numbered word series. The delayed editing point Tsk is delayed by an amount D from the editing point Ts with respect to the even numbered word series. Accordingly, the odd numbered words (Oa) of magnetic tape 9A and the even numbered words (Eb) of magnetic tape 9B exist in the interval between the editing points Ts and Tsk.

Because the even and odd word series are deinterleaved in the reproduced data of FIG. 2C, a correction disabling interval of length a occurs beginning at editing points Ts and Tsk, where the length of a is a function of the time-interleaving operation performed on the data. No error correction operations can be performed in the interval from Ts to Ts+a and the interval from Tsk to Tsk+a. The reproduced data from magnetic tapes 9A and 9B appear together in the respective intervals of Ts to Ts+a and Tsk to Tsk+a. The delay amount D is selected so that the two correction disabling intervals do not overlap.

The process for recovering the reproduced data from magnetic tapes 9A and 9B having the relationship shown in FIG. 2C is next to be described. The odd numbered words (Oa) to which the error correction operation has been performed appear on magnetic tape 9A until the timing point Tsk, as shown in FIG. 2D. The even numbered words (Ea) on which the error correction operations have been performed appears until timing point Ts. Consequently, both even and odd words (Ea) and (Oa) can be used for ordinary reproduction until timing point Ts. It is to be appreciated that no even numbered words for magnetic tape 9A appear in the interval from Ts to Tsk. In order to supply even numbered words in the interval from Ts to Tsk, the odd numbered words (Oa) are interpolated to generate even numbered words Ea' (where the apostrophe indicates the interpolated words).

The even numbered word series (Eb) to which the error correction operations have been performed appears after the editing point Ts+a on magnetic tape 9B, as shown in FIG. 2E. Since no odd numbered words appear in the interval from Ts+a to Tsk, error correction operations cannot be performed in that interval. Accordingly, an odd numbered word series Ob' is generated for the interval Ts+a to Tsk+a by interpolating with the even numbered words (Eb). Since both the even numbered word series (Eb) and the odd numbered word series (Ob) appear in the interval after editing point Tsk+a, the usual reproduction of the recorded signal can be performed.

As is evident from FIGS. 2D and 2E, PCM data for the respective magnetic tapes 9A and 9B appear in the interval from Ts+a to Tsk. A cross-fader can be used to cross-fade in the overlapping interval to provide a smooth transition from the data recorded on magnetic tape 9A to the data recorded on magnetic tape 9B. In other words, the level of the reproduced data from magnetic tape 9A can be gradually reduced (faded-out) in the cross-fading interval, while the level of the reproduced data from magnetic tape 9B can be gradually increased (faded-in). The cross-fade operations are performed by a mathematical operation using a coefficient and a multiplier as described, for example, in U.S. Pat. No. 4,327,382 to Tanaka. A multiplier and coefficient generator generates the coefficient and changes its value as a function of time. The multiplier multiplies the PCM data with the coefficient from the multiplier and coefficient generator. While the interpolated even numbered word series and odd numbered word series Ea' and Ob' approximate the original data, a good quality audio signal is derived therefrom even when there is a large deviation between the interpolated even numbered word series and the interpolated odd numbered word series Ea' and Ob', since the data appear only in the cross-fading interval, and are of diminished volume.

Figure 3A:
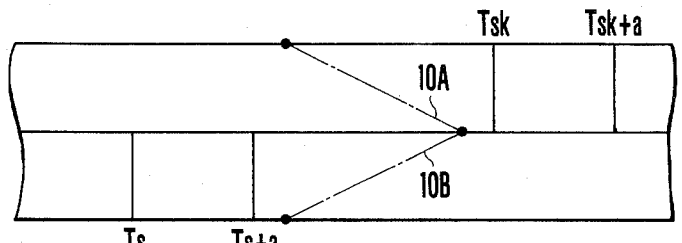
FIGS. 3A–3C are schematic representations of magnetic tapes bearing signals to be combined showing the cross-fading point according to the present invention.

As shown in FIG. 3A, a coefficient $(1-\alpha t)$, which gradually decreases, is multiplied with the data from magnetic tape 9A to the fading out point, as indicated by reference numeral 10A. At the same time, as indicated by reference numeral 10B in FIG. 3A, a coefficient which gradually increases is multiplied with the data from magnetic tape 9B to the fading in point. Just as in the prior art, the starting point of the cross-fading operation is predetermined. The changes in the values of the coefficients $(1-\alpha t)$, $\alpha t$, corresponding to the first and second data, begin simultaneously. It is to be appreciated that the values of the coefficients $\alpha t, (1-\alpha t)$, cannot change during the intervals where the error correction is disabled, i.e., the interval Ts to Ts+a and the interval Tsk to Tsk+a. In addition, the values of the coefficient $(1-\alpha t)$, $\alpha t$, cannot be changed in the interval where a large number of errors are detected due to, for example, a drop-out.

Figure 3B:
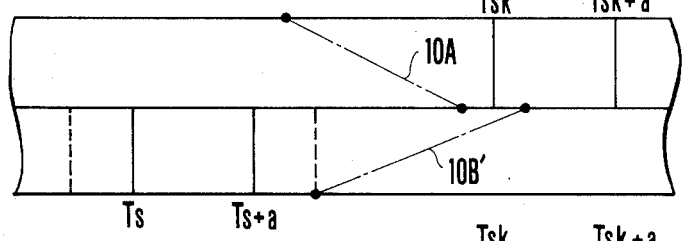

As indicated by the broken vertical lines in FIG. 3B, the interval where many errors are detected near the splice editing point can become so long that it exceeds the error correction disabling interval as described above. The digital signal is accordingly muted during such intervals so as to improve the quality of the signal reproduced therefrom. As illustrated in FIG. 3B, the average level of an audio PCM signal in the cross-fading interval is reduced. The start point of the cross-fading is fixed, i.e., the decrease in the value of the coefficient indicated by reference numeral 10A begins at a predetermined point and reaches the zero level at a second predetermined point. On the other hand, the increase in the value of the coefficient indicated by reference numeral 10B' begins after the muting operation has ended, i.e., at the point indicated by the broken vertical line. However, since the increase in the value of the coefficient indicated by reference numeral 10B' begins after the decrease in the value of the coefficient indicated by reference numeral 10A, the value of the coefficient indicated by reference numeral 10B' does not reach its maximum value before the value of the coefficient indicated by reference numeral 10A reaches its minimum value. The average PCM signal derived during the cross-fading interval is thus reduced, with the result being the same as if a muting operation had been performed on the PCM signal during the cross-fading interval.

An embodiment of an apparatus in accord with the present invention proposes a solution to the aforementioned problems and performs a good cross-fading between first and second digital data. In accord with the invention, the multiplier and the coefficient from the multiplier and coefficient generator for the first data and the second data, respectively, can be independently controlled. The fade-in of the second data begins at a time when the second data can be output. Moreover, this timing coincides with the beginning of the fading-out of the first data.

Figure 3C:
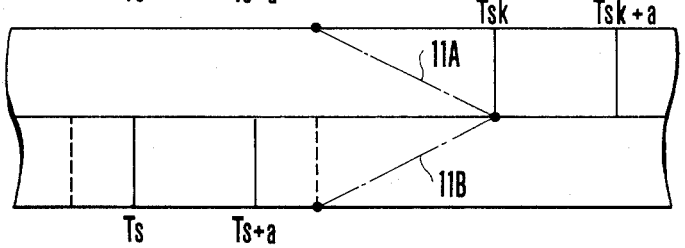

In the example of FIG. 3C, the beginning point for the increase in the value of the coefficient indicated by reference numeral 11B is shifted in time so that it occurs after the muting operation has been performed on the second data. Correspondingly, the starting point for the decrease in the value of the coefficient indicated by reference numeral 11A for the first data occurs simultaneously. A smooth cross-fading between the first and second data can thus be achieved.

Figure 4:
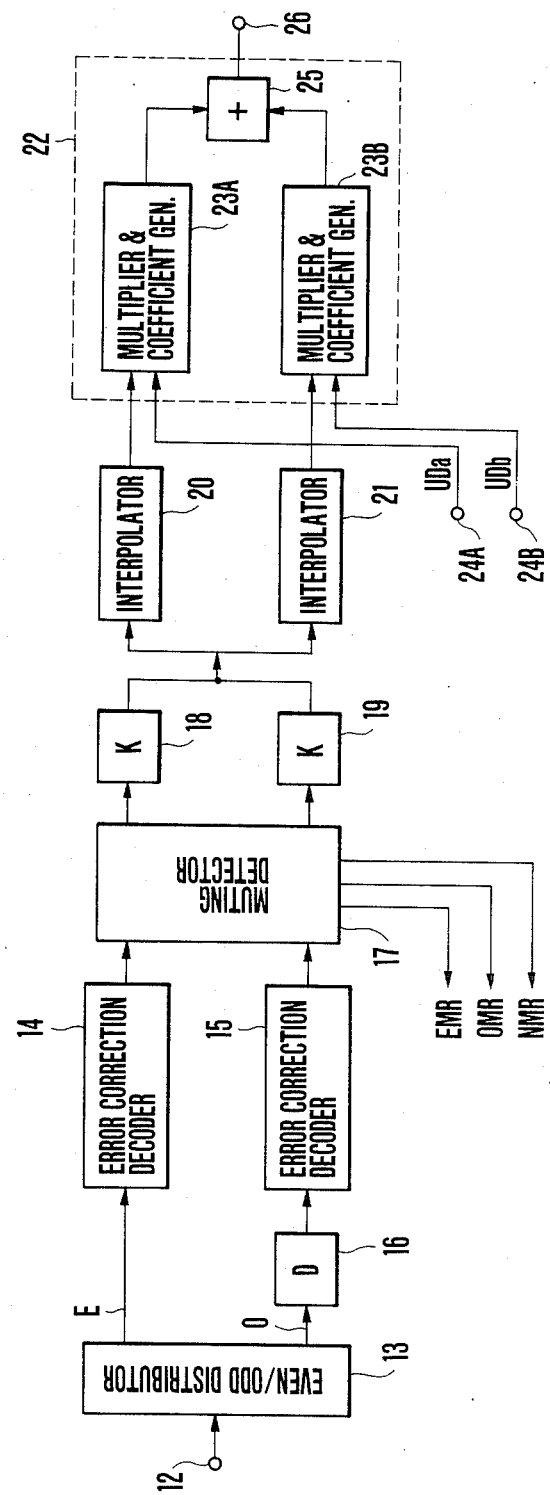
FIG. 4 is a block diagram of an embodiment of an apparatus in accord with the present invention.

FIG. 4 illustrates an embodiment of an apparatus in accord with the present invention. The apparatus of FIG. 4 can be included, for example, in the reproduction circuit of an audio PCM tape recorder and corresponds to the apparatus of FIG. 1. PCM data is reproduced from the magnetic tape, demodulated, and supplied to a time base correcting circuit (TBC) and thence, to an input terminal 12. The PCM data is divided into an even numbered word series and an odd numbered word series by an even/odd distributor 13. The even numbered word series is supplied to an error correction decoder 14. The odd numbered word series is supplied to an error correction decoder 15 through a delay circuit 16 which has a delay amount of D. Error correction decoders 14, 15 perform error correction in each series. The corrected data from error correction decoders 14, 15 are supplied to a muting detector 17.

Muting detector 17 supervises the even numbered word series and the odd numbered word series after the error correction operation has been performed and generates muting request signals EMR, OMR or NMR when there are a large number of errors in the word series and interpolation between the values for the missing words cannot be performed. (It is to be appreciated that a muting operation is performed on the data when the errors therein are so numerous as to make error correction operations thereon infeasible.) Muting request signal EMR is generated in response to the even numbered word series. Muting request signal OMR is generated in response to the odd numbered word series. Muting request signals EMR, OMR are tested to determine whether the corresponding even and odd words can be used even when only one word is to be interpolated. In a preferred embodiment, muting request signals EMR, OMR have a value of "0" if the corresponding words cannot be used, and have a value of "1" when the corresponding words can be used. Muting request signal NMR indicates whether the corresponding words can be used in a combination of the even numbered word series and the odd numbered word series.

The even numbered word series and the odd numbered word series from muting detector 17 are supplied to a pair of interpolators 20, 21 through a pair of delay circuits 18, 19 which introduce a delay of an amount K. Interpolator 20 interpolates the even numbered word series by using the odd numbered word series to produce a PCM word series which includes corrected and interpolated words. Interpolator 21 interpolates the odd numbered word series from the even numbered word series to produce a PCM word series which also includes both corrected and interpolated words. Therefore, when a magnetic tape has been splice edited, the first block of PCM data reproduced from magnetic tape 9A (as shown in FIG. 2D) is supplied from interpolator 20. (It is to be appreciated that the first block of PCM data is divided into even numbered word series and odd numbered word series.) The second block of PCM data reproduced from magnetic tape 9B (as shown in FIG. 2E) is supplied from interpolator 21. (Just as in the former case, the second block of PCM data has been divided into an even numbered word series and an odd numbered word series.)

The output signals from interpolators 20, 21 are respectively supplied to a pair of multiplier and coefficient generators 23A, 23B in a cross-fader 22. Up/down control signals UDa and UDb are supplied from corresponding input terminals 24A, 24B to multiplier and coefficient generators 23A, 23B. The output signals from multiplier and coefficient generators 23A, 23B are added in an adder 25 and then supplied to an output terminal 26. A digital to analog converter (not shown) converts the digital signal from output terminal 26 into an analog audio signal in response thereto.

Cross-fader 22 requires a time K for the coefficient $\alpha t$ to change from 0 to 1 or from 1 to 0. Control signals UDa, UDb indicate the direction of the change of coefficient $\alpha t$. When coefficient t is less than one, and if control signals UDa and UDb are both one (thereby indicating an increase in value or "up"), coefficient t increases in value and stops when it reaches the maximum value of one ("1"). When coefficient $\alpha t$ is greater than 0, and if both control signals UDa and UDb are 0, (indicating a decrease in value or "down"), coefficient $\alpha t$ decreases in value and stops at the minimum value of zero ("0").

Referring to FIG. 6A, the data included in the interval to be muted (indicated by the oblique lines) is supplied to muting detector 17, and a muting request signal as shown in FIG. 6B is generated in response thereto. FIG. 6C illustrates a control signal for the up/down changes performed by cross-fader 22. Namely, the up-/down control signal is generated so that when the muting request signal drops to zero ("0"), the up/down control signal immediately drops to zero ("0"). When the muting request signal increases to one ("1"), the up/down control signal increases to one ("1") after a delay of amount K. The coefficient of cross-fader 22 changes as shown in FIG. 6D. Since delay circuits 18, 19 are included in the circuit of FIG. 4, the data supplied to cross-fader 22 is also delayed by an amount K from the timing of the original data, as shown in FIG. 6E. Therefore, the fade-out of the original data is performed immediately before the muting operation, and the fade-in is performed immediately after the termination of the muting operation.

Figure 5:
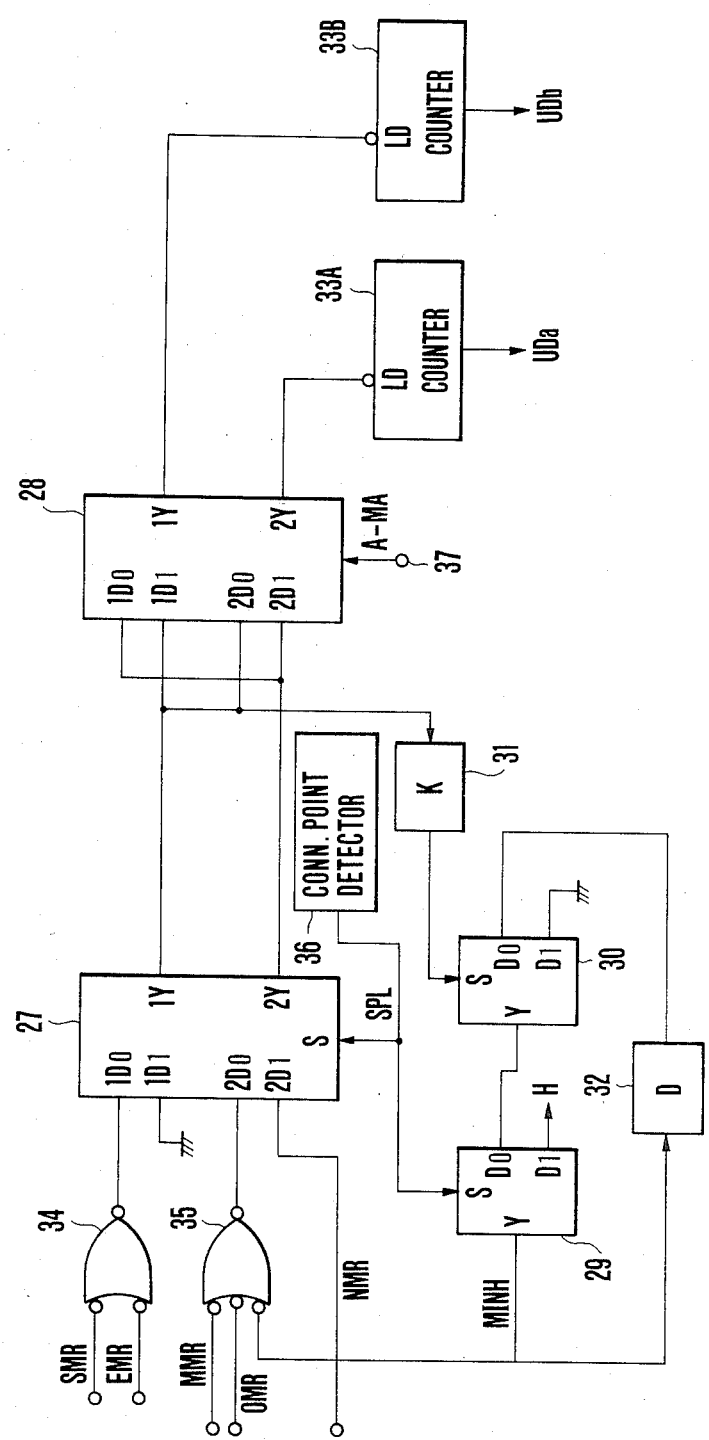
FIG. 5 is a block diagram of a circuit in accord with the present invention for generating a control signal for a cross-fader included in the embodiment of FIG. 4.

FIG. 5 illustrates a circuit in accord with the present invention with generates up/down control signals for cross-fader 22 in response to muting request signals EMR, OMR, and NMR from muting detector 17. The circuit of FIG. 5 includes four selectors 27, 28, 29 and 30, a delay circuit 31 having a delay amount of K, a delay circuit 32 having a delay amount of D, and a pair of muting counters 33A, 33B for generating control signals UDa and UDb, respectively.

Muting request signals SMR and EMR are supplied to a NOR gate 34. The output signal from NOR gate 34 is supplied to input terminal $1D_o$ of selector 27. A second input terminal $1D_1$ of selector 27 is tied to ground, so that a zero signal ("0") is always supplied thereto. Muting request signals MMR and OMR and an output signal MINH from selector 29 are supplied to a NOR gate 35. The output signal from NOR gate 35 is supplied to an input terminal $2D_o$ of selector 27. Muting request signal NMR is supplied to an input terminal $2D_1$ of selector 27. A signal SPL, indicative of the splice interval, is supplied to an input terminal S from a connecting point detector 36 as a control signal for selector 27.

FIGS. 7A and 7B illustrate the timing of muting request signals SMR and MMR, respectively. An apparatus for generating signals in response to the detection of splice point Ps is described, for example, in copending application Ser. No. 06/290,197, filed Nov. 9, 1981. As described before with reference to FIG. 2, muting request signal SMR has a value of zero ("0") during the muting interval for the second digital data indicated by the timing points Ts and Ts+a (where the splice editing point corresponds to the timing point Ts). Muting request signal MMR is zero ("0") in the muting interval for the first digital data indicated by the timing points Tsk and Tsk+a. Signal SPL is zero ("0") in the splice interval from Ts to Tsk+a, as shown in FIG. 7C. A signal A−MA, as shown in FIG. 7D, is inverted at the rising edge of signal SPL, and is supplied from an input terminal 37 to selector 28 ( see FIG. 5). Signal SPL, which, as indicated before, is indicative of the splice interval, is generated in response to an interleave error in the digital data, a phase jump in a control signal, or the like.

In the interval before editing point Ts, signals SPL and A−MA are both one ("1"), so that selector 27 supplies the signals at input terminals $1D_1$ and $2D_1$ to output terminals 1Y, 2Y, respectively. Accordingly, the output signal at output terminal 1Y is zero ("0"), while the output signal at output terminal 2Y is equal to the value of signal NMR. The output signal from output terminal 1Y of selector 27 is supplied to input terminals $1D_1$ and $2D_o$ of selector 28. The output signal of selector 28 at output terminal 1Y is zero ("0"), while the output signal at output terminal 2Y is equal to the value of NMR in the interval before the editing point Ts. The output signal from output terminal 1Y of selector 28 is the load input signal for muting counter 33B. The output signal from output terminal 2Y of selector 28 is a load input signal for muting counter 33A. In other words, up/down control signal UDa from muting counter 33A controls the coefficient of multiplier and coefficient generator 33A before splice point Ts. Up-/down control signal UDb from muting counter 33B controls the coefficient from multiplier and coefficient generator 23B to be zero at all times. Accordingly, the first digital data are supplied through multiplier and coefficient generator 23A and adder 25 to output terminal 26.

In the interval after timing point Tsk+a, the output signal appearing at output terminal 1Y of selector 28 is equal to NMR and the output signal appearing at output terminal 2Y of selector 28 is zero ("0"), since signal SPL is one ("1") and signal A−MA is zero ("0"). In contradistinction to the above description with reference to an editing point, the coefficient of multiplier and coefficient generator 23A is zero ("0"), while the coefficient of the other multiplier and coefficient generator 23B is controlled in response to up/down control signal UDb from muting counter 33B, through which the second digital data are output. In normal reproduction, i.e., before splice point Ts, after point Tsk+a, and excluding the splice intervals, selector 29 always outputs a one ("1") to be supplied to NOR gate 35 and delay circuit 32.

The operation of the embodiment of FIGS. 4 and 5 at a splice interval in the magnetic tape will next be described with reference to FIG. 8. FIG. 8A illustrates the timing of muting request signal EMR from muting detector 17, while FIG. 8B illustrates the timing of muting request signal OMR from muting detector 17. As shown in the intervals indicated by the oblique lines in FIGS. 8A and 8B, muting request signals EMR and OMR are generated and exceed the error correction disabling interval due to, for example, a drop-out or the like near the splice editing point. Since it can happen that muting request signals EMR and OMR in the intervals of Ts to Ts+a and Tsk to Tsk+a are one ("1"), each interval is indicated by a broken line in the figures.

The output signal at output terminal 1Y of FIG. 8C is generated by selector 27, and has a value of zero ("0") in the normal reproduction mode, i.e., away from a splice point. The output signal at output terminal 1Y is zero ("0") when either of muting request signals SMR or EMR supplied to NOR gate 34 is zero ("0"). The output signal at output terminal 1Y of selector 27 is delayed by delay circuit 31 for an amount K, and the delayed signal shown in FIG. 8D is supplied to selector 30 to generate a zero ("0") as the output thereof. The output signal from selector 30 is supplied to NOR gate 35 through selector 29 as signal MINH, as shown in FIG. 8E, and is then supplied to delay circuit 32. The output signal from delay circuit 32 is supplied to selector 30 where a holding operation is performed thereon. The output signal at output terminal 2Y of selector 27 is shown in FIG. 8F. The output signals at output terminals 1Y and 2Y of selector 27 are respectively supplied to load terminals LD of muting counters 33A, 33B, respectively, through selector 28 as muting request signals, and are of a predetermined value.

The coefficient from multiplier and coefficient generator 23A decreases toward zero ("0") as shown FIG. 8I in response to up/down control signal UDa (see FIG. 8G). Up/down control signal UDa drops to zero at the falling edge of the output signal appearing at output terminal 2Y of selector 28 (and is of the same value as indicated in FIG. 8F). Accordingly, the fading out of the first digital data from interpolator 20 is performed. Muting counter 33B generates up/down control signal UDb, as aforementioned, which rises after a delay of amount K after the falling edge of the output signal appears at output terminal 1Y of selector 28 (and has the same timing as depicted in FIG. 8C). The coefficient from multiplier and coefficient generator 23B thus increases toward its maximum value of one ("1"), as shown in FIG. 8J, thereby executing a fading in of the second digital data from interpolator 21.

In such a fashion, the coefficient from multiplier and coefficient generator 23B begins to increase from the time when the data from interpolator 21 can be output. The coefficient from multiplier and coefficient generator 23A begins to decrease in value from a point in time which coincides with the point in time when the value of the coefficient from multiplier and coefficient generator 23B begins to increase. After the cross-fading operation has been performed, and the splice interval (which includes a new splice editing point) appears in the data supplied to multiplier and coefficient generator 23B, a similar cross-fading operation as described above can be performed.

The time chart of FIG. 9 indicates the operation of the embodiment of FIGS. 4 and 5 when muting request signals EMR and OMR, as shown in FIGS. 9A and 9B, respectively, have been generated in response to a muting interval which extends for a much longer period as compared with the muting interval of FIG. 8 due to, for example, a drop-out or the like. As illustrated in FIG. 9C, the rising edge of the signals at output terminal 1Y of selectors 27 and 28 are delayed as described above in response to the extension of the muting interval when muting request signals EMR and OMR are zero ("0"). In a like fashion, the falling edges of the output signals at output terminal 2Y of selectors 27 and 28 are delayed in response to the extension of the muting interval where muting request signals EMR and OMR are zero ("0"), as illustrated in FIG. 9F. FIGS. 9I and 9J illustrate the respective coefficients from multiplier and coefficient generators 23A and 23B of cross-fader 22. It is to be appreciated that the start point of the cross-fading is further delayed as compared with the interval described with reference to FIG. 8.

FIG. 10 illustrates the time charts for the interval in which muting request signals EMR and OMR are both zero ("0") overlap, as shown in FIGS. 10A and 10B. It is to be noted that this case occurs when the interval in which a large number of errors are detected near a splice point is extremely long. The coefficient from multiplier and coefficient generator 23A begins to decrease towards its minimum value, as shown FIG. 10I, before the coefficient from multiplier and coefficient generator 23B begins to increase towards its maximum value, as shown in FIG. 10J. It is to be appreciated from a reference to muting request signal OMR that the data from multiplier and coefficient generator 23A cannot be output. Accordingly, in the example of FIG. 10, a normal cross-fading operation cannot be performed. While the starting point for a cross-fading operation is predetermined, it is, nevertheless, possible to prevent both multiplier and coefficient generators 23A, 23B from performing a simultaneous muting operation on the data.

As described above with reference to the present invention, two independently controllable multiplier and coefficient generators are provided in which the coefficient increases when the second digital data can be output, and in which the coefficient for the first digital data begins to decrease to its minimum value when the first digital data cannot be output or when the coefficient for the second digital data starts to increase even if it can be output. Further as described above, multiplier and coefficient generator 23A fades out the first digital data when one of the muting request signals EMR and OMR terminates and signal SPL is zero ("0"), and also when the other of the muting request signals EMR and OMR is generated. Multiplier and coefficient generator 23B fades in the second digital data when one of the muting request signals EMR and OMR terminates. Therefore, it is possible to prevent an undesirable reduction in the level of the data to be output even if the interval where many errors are detecting at a splice point changes, or even if the interval to which a muting operation is to be performed thereon changes.

It is possible for the tape speed to substantially increase, whereby the amount of data recorded thereafter increases, after a splice editing point is detected so that the data before and after the splice editing point overlap.

Although a specific embodiment of the present invention has been described in detail herein with reference to the accompanying drawings, it is to be understood that the invention is not limited to that precise embodiment, and that various changes and modifications may be effected therein by one skilled in the art without departing from the spirit and scope of the invention as defined in the appended claims.

What is claimed is:

1. In an apparatus for reproducing from a record medium a composite digital data signal that was formed by connecting first and second digital data signals, in which said first and second signals are interleave-coded so that the signals overlap before and after a connecting point between the respective signals, thereby forming the composite digital data signal, and in which said composite digital data signal is muted in the vicinity of said connecting point for limiting errors in the output from the apparatus; the combination of:

detector means receiving said composite digital data signal for detecting a termination point of said muting of said second digital data signal and generating a detection signal upon such detection; and cross-fading means receiving said composite digital data signal and said detection signal for gradually reducing data values of said first digital data signal and gradually increasing data values of said second digital data signal in response to said detection signal.

2. The apparatus of claim 1; in which said detector means includes an error detector for detecting errors in said first and second digital data signals forming said composite digital data signal and supplying muting request signals for use in forming said detection signal.

3. The apparatus of claim 2, wherein said first and second digital data are comprised of time-interleaved even and odd numbered words; and further including distributor means for separating said even and odd numbered words and supplying said even and odd numbered words to said error detector.

4. The apparatus of claim 3; wherein said error detector generates an even muting request signal in response to errors detected in said even numbered words, and an odd muting request signal in response to the errors detected in said odd numbered words.

5. The apparatus of claim 4; and further including means for detecting said connecting point and generating a connecting point signal in response thereto.

6. The apparatus of claim 5; wherein said detecting means generates said detection signals to actuate said cross-fading means to fade out said first digital data in response to the termination of one of said even and odd muting request signals and said generation of said connecting point signal.

7. The apparatus of claim 6; wherein said detecting means generates said detection signals to actuate said cross-fading means to fade out said first digital data in response to said generation of the other of said even and odd muting request signals.

8. The apparatus of claim 7; wherein said detecting means generates said detection signals to actuate said cross-fading means to fade in said second digital data in response to the termination of one of said even and odd muting request signals.

9. The apparatus of claim 8; and further comprising delay means connected to said distributor means for correcting said time-interleaving of said even and odd numbered words.

10. The apparatus of claim 9, in which said even and odd numbered words include respective even and odd error correction codes; and further including error correcting means responsive to said even and odd error correction codes for removing errors from said even and odd numbered words.

11. The apparatus of claim 10; wherein said decoding means includes even and odd error correction decoders respectively receiving the separated even and odd numbered words.

12. The apparatus of claim 10; and further comprising interpolator means for receiving said even and odd numbered words and generating odd and even numbered interpolated words, respectively, therefrom.

13. The apparatus of claim 12; wherein said cross-fading means includes:
a first cross-fader for fading-out said odd numbered words and said even numbered interpolated words;
a second cross-fader for fading in said even numbered words and said odd numbered interpolated words; and
adding means connected to said first and second cross-faders for adding together the faded-out and faded-in signals therefrom.

14. The apparatus of claim 13; and further including delay means between said error detector and said interpolator means for delaying said odd and even numbered words by a predetermined amount.

15. In an apparatus for reproducing an information signal from an edited signal formed by connecting first and second audio PCM data from first and second magnetic tapes which have been splice edited together, each of said first and second audio PCM data being comprised of an even series and an odd series of digital words, and in which said edited signal is muted at the connection of said first and second data at a splice point for limiting errors in an output information signal from the apparatus; the combination of:
error detector means receiving said edited signal for detecting errors in said even and odd series of digital words in the vicinity of the connection between the first and second audio PCM data and generating respective even and odd muting request signals upon such detection;
splice point detector means receiving said edited signal for detecting the splice point between said first and second audio PCM data and generating a splice control signal in response thereto; and
cross-fading means receiving said even and odd muting request signals, said splice control signal, and said edited signal for fading out said first audio PCM data in response to termination of a first one of said even and odd muting request signals while said splice control signal is present and in response to generation of a second one of said even and odd muting request signals, and for fading in said second audio PCM data when one of said even and odd muting request signals terminates.

16. The apparatus of claim 15; and further comprising distributing means for separating said even series of digital words and said odd series of digital words in said audio PCM data.

17. The apparatus of claim 16; wherein said cross-fading means includes:
a first fader element for fading out said first audio PCM signal;
a second fader element for fading in said second audio PCM signal; and
adding means for adding together the faded-out and faded-in signals from said first and second fader elements.

18. The apparatus of claim 17, in which said even and odd digital words are time-interleaved; and further comprising delay means for compensating for said time-interleaving of said even and odd digital words.

19. The apparatus of claim 18; and further including interpolating means for providing interpolated odd and even digital words in response to said even and odd digital words supplied thereto.

20. The apparatus of claim 19, in which said even and odd digital words include error correction codes; and further comprising decoding means connected to said distributing means for removing errors from said even and odd digital words.

* * * * *